(12) United States Patent
Paek et al.

(10) Patent No.: US 8,090,738 B2
(45) Date of Patent: Jan. 3, 2012

(54) MULTI-MODAL SEARCH WILDCARDS

(75) Inventors: Timothy Seung Yoon Paek, Sammamish, WA (US); Bo Thiesson, Woodinville, WA (US); Yun-Cheng Ju, Bellevue, WA (US); Bongshin Lee, Issaquah, WA (US); Christopher A. Meek, Kirkland, WA (US)

(73) Assignee: Microsoft Corporation, Redmond, WA (US)

(*) Notice: Subject to any disclaimer, the term of this patent is extended or adjusted under 35 U.S.C. 154(b) by 519 days.

(21) Appl. No.: 12/200,625

(22) Filed: Aug. 28, 2008

(65) Prior Publication Data

US 2009/0287681 A1 Nov. 19, 2009

Related U.S. Application Data

(60) Provisional application No. 61/053,214, filed on May 14, 2008.

(51) Int. Cl.
  *G06F 7/00* (2006.01)
  *G06F 17/30* (2006.01)

(52) U.S. Cl. ......... 707/765; 707/766; 707/767; 704/243

(58) Field of Classification Search .......... 707/765–767; 704/243
See application file for complete search history.

(56) References Cited

U.S. PATENT DOCUMENTS

| | | | |
|---|---|---|---|
| 6,564,213 B1 | 5/2003 | Ortega et al. | |
| 7,027,987 B1 | 4/2006 | Franz et al. | |
| 7,096,218 B2* | 8/2006 | Schirmer et al. | 707/767 |
| 7,277,029 B2 | 10/2007 | Thiesson et al. | |
| 7,461,059 B2 | 12/2008 | Richardson et al. | |
| 7,778,837 B2* | 8/2010 | Thiesson et al. | 704/278 |
| 7,797,303 B2 | 9/2010 | Roulland et al. | |
| 2002/0123876 A1* | 9/2002 | Pokhariyal et al. | 704/1 |
| 2004/0054541 A1* | 3/2004 | Kryze et al. | 704/275 |
| 2005/0283364 A1 | 12/2005 | Longe et al. | |
| 2006/0190256 A1 | 8/2006 | Stephanick et al. | |
| 2006/0190436 A1* | 8/2006 | Richardson et al. | 707/3 |
| 2006/0293890 A1 | 12/2006 | Blair et al. | |
| 2007/0022005 A1 | 1/2007 | Hanna | |
| 2007/0050191 A1 | 3/2007 | Weider et al. | |
| 2007/0061335 A1 | 3/2007 | Ramer et al. | |
| 2007/0061336 A1 | 3/2007 | Ramer et al. | |
| 2007/0067345 A1 | 3/2007 | Li et al. | |
| 2007/0162422 A1 | 7/2007 | Djabarov | |
| 2007/0164782 A1 | 7/2007 | Church et al. | |
| 2007/0239670 A1 | 10/2007 | Aggarwal et al. | |
| 2007/0299824 A1 | 12/2007 | Pan et al. | |
| 2008/0086311 A1 | 4/2008 | Conwell et al. | |

(Continued)

OTHER PUBLICATIONS

Chang, et al., "Efficient Web Search on Mobile Devices with Multi-Modal Input and Intelligent Text Summarization", in the Proceedings of the Eleventh International World Wide Web Conference, May 2002, 4 pgs.

(Continued)

*Primary Examiner* — John E Breene
*Assistant Examiner* — Joshua Bullock
(74) *Attorney, Agent, or Firm* — Lee & Hayes, PLLC

(57) ABSTRACT

A multi-modal search system (and corresponding methodology) that employs wildcards is provided. Wildcards can be employed in the search query either initiated by the user or inferred by the system. These wildcards can represent uncertainty conveyed by a user in a multi-modal search query input. In examples, the words "something" or "whatchamacallit" can be used to convey uncertainty and partial knowledge about portions of the query and to dynamically trigger wildcard generation.

20 Claims, 8 Drawing Sheets

U.S. PATENT DOCUMENTS

| | | |
|---|---|---|
| 2008/0162471 A1 | 7/2008 | Bernard |
| 2008/0215555 A1 | 9/2008 | Pan et al. |
| 2009/0006343 A1* | 1/2009 | Platt et al. .......................... 707/4 |
| 2009/0019002 A1 | 1/2009 | Boulis |
| 2010/0125457 A1 | 5/2010 | Gilbert et al. |

OTHER PUBLICATIONS

Office Action for U.S. Appl. No. 12/200,648, mailed on Apr. 27, 2011, Timothy S. Paek, "Multi-Modal Query Generation", 20 pages.

Final Office Action for U.S. Appl. No. 12/200,584, mailed on Jun. 8, 2011, Timothy Seung Yoon Park, "Multi-Modal Query Refinement", 17 pages.

Non-Final Office Action for U.S. Appl. No. 12/200,584, mailed on Oct. 6, 2011, Timothy Seung Paek, "Multi-Modal Query Refinement", 18 pages.

Office Action for U.S. Appl. No. 12/200,648, mailed on Oct. 24, 2011, Timothy S. Paek, "Multi-Modal Query Generation", 19 pgs.

* cited by examiner

MULTI-MODAL SEARCH WILDCARDS

CROSS-REFERENCE TO RELATED APPLICATIONS

This application claims the benefit of U.S. Provisional Patent application Ser. No. 61/053,214 entitled "MULTI-MODALITY SEARCH INTERFACE" and filed May 14, 2008. This application is related to pending U.S. patent application Ser. No. 12/200,648 entitled "MULTI-MODAL QUERY GENERATION" filed on Aug. 28, 2008 and to pending U.S. patent application Ser. No. 12/200,584 entitled "MULTI-MODAL QUERY REFINEMENT" filed on Aug. 28, 2008. The entireties of the above-noted applications are incorporated by reference herein.

BACKGROUND

The Internet continues to make available ever-increasing amounts of information which can be stored in databases and accessed therefrom. With the proliferation of mobile and portable terminals (e.g., cellular telephones, personal data assistants (PDAs), smartphones and other devices), users are becoming more mobile, and hence, more reliant upon information accessible via the Internet. Accordingly, users often search network sources such as the Internet from their mobile device.

There are essentially two phases in an Internet search. First, a search query is constructed that can be submitted to a search engine. Second the search engine matches this search query to actual search results. Conventionally, these search queries were constructed merely of keywords that were matched to a list of results based upon factors such as relevance, popularity, preference, etc.

The Internet and the World Wide Web continue to evolve rapidly with respect to both volume of information and number of users. As a whole, the Web provides a global space for accumulation, exchange and dissemination of information. As mobile devices become more and more commonplace to access the Web, the number of users continues to increase.

In some instances, a user knows the name of a site, server or URL (uniform resource locator) to the site or server that is desired for access. In such situations, the user can access the site, by simply typing the URL in an address bar of a browser to connect to the site. Oftentimes, the user does not know the URL and therefore has to 'search' the Web for relevant sources and/or URL's. To maximize likelihood of locating relevant information amongst an abundance of data, Internet or web search engines are regularly employed.

Traditionally, to locate a site or corresponding URL of interest, the user can employ a search engine to facilitate locating and accessing sites based upon alphanumeric keywords and/or Boolean operators. In aspects, these keywords are text- or speech-based queries, although, speech is not always reliable. Essentially, a search engine is a tool that facilitates web navigation based upon textual (or speech-to-text) entry of a search query usually comprising one or more keywords. Upon receipt of a search query, the search engine retrieves a list of websites, typically ranked based upon relevance to the query. To enable this functionality, the search engine must generate and maintain a supporting infrastructure.

Upon textual entry of one or more keywords as a search query, the search engine retrieves indexed information that matches the query from an indexed database, generates a snippet of text associated with each of the matching sites and displays the results to the user. The user can thereafter scroll through a plurality of returned sites to attempt to determine if the sites are related to the interests of the user. However, this can be an extremely time-consuming and frustrating process as search engines can return a substantial number of sites. More often than not, the user is forced to narrow the search iteratively by altering and/or adding keywords and Boolean operators to obtain the identity of websites including relevant information, again by typing (or speaking) the revised query.

Conventional computer-based search, in general, is extremely text-centric (pure text or speech-to-text) in that search engines typically analyze content of alphanumeric search queries in order to return results. These traditional search engines merely parse alphanumeric queries into 'keywords' and subsequently perform searches based upon a defined number of instances of each of the keywords in a reference.

Currently, users of mobile devices, such as smartphones, often attempt to access or 'surf' the Internet using keyboards or keypads such as, a standard numeric phone keypad, a soft or miniature QWERTY keyboard, etc. Unfortunately, these input mechanisms are not always efficient for the textual input to efficiently search the Internet. As described above, conventional mobile devices are limited to text input to establish search queries, for example, Internet search queries. Text input can be a very inefficient way to search, particularly for long periods of time and/or for very long queries.

SUMMARY

The following presents a simplified summary of the innovation in order to provide a basic understanding of some aspects of the innovation. This summary is not an extensive overview of the innovation. It is not intended to identify key/critical elements of the innovation or to delineate the scope of the innovation. Its sole purpose is to present some concepts of the innovation in a simplified form as a prelude to the more detailed description that is presented later.

The innovation disclosed and claimed herein, in one aspect thereof, comprises a search system and corresponding methodologies that can convert multi-modal inputs, e.g., speech, text and touch, into wildcards for use with search interfaces and engines. In other words, the innovation can automatically convert spoken words, text strings, gestures or the like into wildcards thereby enhancing effectiveness of search mechanisms. Accordingly, it can be possible to locate more meaningful and comprehensive results as a function of a search query.

In other aspects, the innovation can be incorporated or retrofitted into existing search engines and/or interfaces. Yet other aspects employ the features, functionalities and benefits of the innovation in mobile search applications, which have strategic importance given the increasing usage of mobile devices as a primary computing device. As described above, mobile devices are not always configured or equipped with full-function keyboards, thus, the multi-modal wildcard functionality of the innovation can be employed to greatly enhance comprehensiveness of search.

The innovation discloses systems (and corresponding methodologies) that expand the conventional capabilities of voice-activated or voice-assisted search to allow users to explicitly express their uncertainties as wildcards which are included as part of their queries. In embodiments, this enables users to provide partial knowledge when establishing search queries. In other aspects, the innovation can implicitly recognize uncertainty and automatically employ appropriate wildcard mechanisms to enhance performance and quality of search mechanisms.

Accordingly, the innovation discloses a multi-modal search interface that tightly couples speech, text and touch by utilizing regular expression queries with 'wildcards,' where parts of the query can be input via different modalities (e.g., different modalities such as speech, text, and touch can be used at any point in the query construction or refinement process). In other aspects, the innovation can interpret uncertainty in a spoken recognized result as wildcards in a regular expression query. In yet other aspects, the innovation allows users to express their own uncertainty about parts of their utterance using expressions such as "something" or "whatchamacallit" which then get translated into wildcards. Users can also personalize or modify wildcard terms or phrases as desired, for example, by way of a user interface.

In yet another aspect thereof, machine learning and reasoning is provided that employs a probabilistic and/or statistical-based analysis to prognose or infer an action that a user desires to be automatically performed.

To the accomplishment of the foregoing and related ends, certain illustrative aspects of the innovation are described herein in connection with the following description and the annexed drawings. These aspects are indicative, however, of but a few of the various ways in which the principles of the innovation can be employed and the subject innovation is intended to include all such aspects and their equivalents. Other advantages and novel features of the innovation will become apparent from the following detailed description of the innovation when considered in conjunction with the drawings.

DETAILED DESCRIPTION

Figure 1:
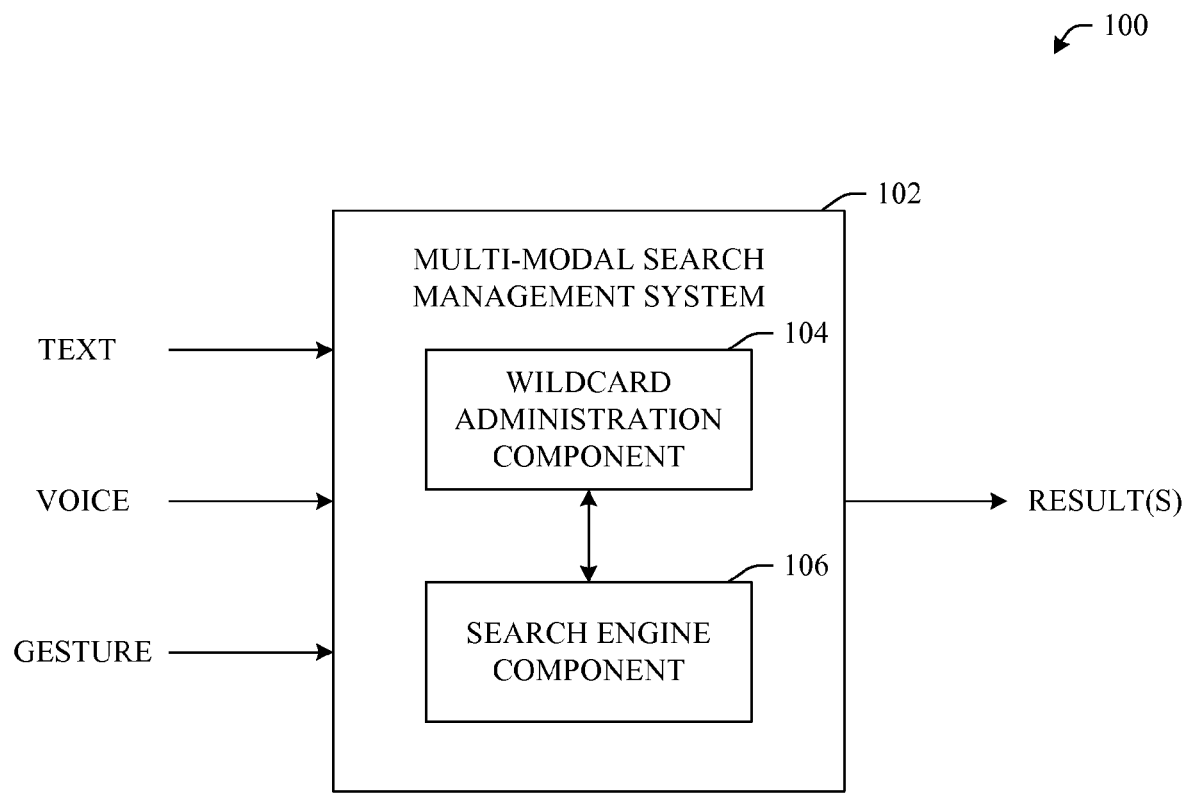
FIG. 1 illustrates an example block diagram of a multi-modal search management component in accordance with an aspect of the innovation.

The innovation is now described with reference to the drawings, wherein like reference numerals are used to refer to like elements throughout. In the following description, for purposes of explanation, numerous specific details are set forth in order to provide a thorough understanding of the subject innovation. It may be evident, however, that the innovation can be practiced without these specific details. In other instances, well-known structures and devices are shown in block diagram form in order to facilitate describing the innovation.

As used in this application, the terms "component" and "system" are intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

As used herein, the term to "infer" or "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

While certain ways of displaying information to users are shown and described with respect to certain figures as screenshots, those skilled in the relevant art will recognize that various other alternatives can be employed. The terms "screen," "web page," and "page" are generally used interchangeably herein. The pages or screens are stored and/or transmitted as display descriptions, as graphical user interfaces, or by other methods of depicting information on a screen (whether personal computer, PDA, mobile telephone, or other suitable device, for example) where the layout and information or content to be displayed on the page is stored in memory, database, or another storage facility.

Referring initially to the drawings, FIG. 1 illustrates an example block diagram of a system 100 that processes multi-modal inputs, infers or identifies wildcards, and generates appropriate queries (e.g., regular expression queries) that are employed to generate results. The system 100 can include a multi-modal search management system 102 that employs a wildcard administration component 104 and a search engine component 106 to process multi-modal inputs into queries that leverage wildcards to enhance comprehensiveness of search results.

As described herein, the wildcard administration component 104 can be employed to recognize, identify or otherwise infer wildcards from a multi-modal input. For instance, regular expressions that include wildcards can be inferred from multi-modal input, for example, by parsing designated wildcard words or phrases, by inferring an intended wildcard or the like. In operation, the wildcard administration component 104 can provide information to the search engine component 106 whereby the search is commenced.

Voice search applications encourage users to "just say what you want" in order to obtain useful content. Example uses of voice search applications, include but are not limited to automated directory assistance (ADA) or web search. Unfortunately, when users only remember part of what they are looking for, they are often forced to guess, regardless if what they know may be sufficient to retrieve the desired information. In this disclosure, it is proposed to expand the capabilities of voice search to allow users to explicitly express their uncertainties as part of their queries, and as such, to provide partial knowledge. Additionally, the innovation discloses mechanisms by which uncertainties are implicitly inferred from an input, such as a multi-modal input.

Applied to ADA, the disclosure highlights enhanced user experiences whereby uncertain expressions afford and delineate how to perform language modeling and information retrieval. The innovation evaluates an approach by assessing its impact on overall ADA performance and by discussing the results of an experiment in which users generated both uncertain expressions as well as guesses for directory listings. Uncertain expressions reduced relative error rate by 31.8% compared to guessing. While examples of the features, functions and benefits of the innovation are described herein as directed to ADA, it is to be understood that alternative aspects can be employed that incorporate advantages of the innovation into most any search environment. These alternative aspects are to be included within the scope of the disclosure and claims appended hereto.

As described above, voice-capable search applications encourage users to "just say what you want" in order to obtain useful content such as business listings, driving directions, movie times, news, research documents, product listings, etc. Because certain types of information require recognition of a large database of choices, voice-based search can be formulated as both a recognition and information retrieval (IR) task, where a spoken utterance is first converted into text and then used as a search query for IR. In accordance with this innovation, the converted search query can include wildcards in an effort to better align with a user intention.

Figure 2:
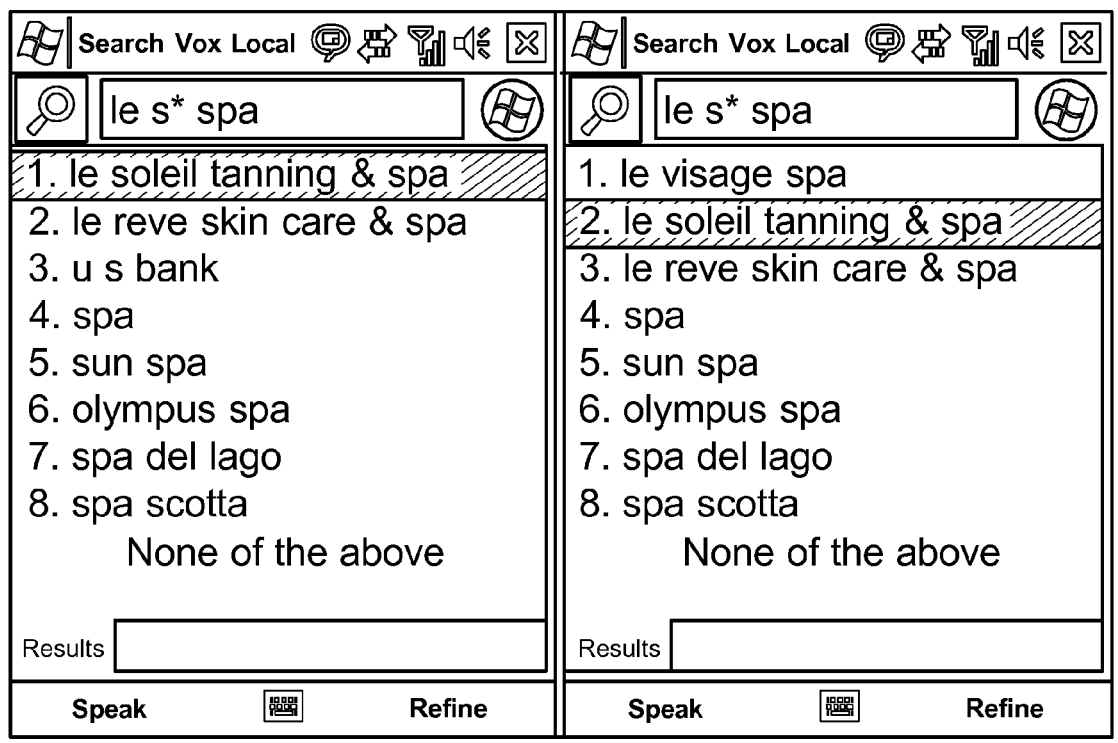
FIG. 2 illustrates an example screenshot that illustrates wildcard usage in accordance with the innovation.

Returning to the ADA example above, ADA exemplifies the challenges of voice search. Not only are there millions of possible telephone/address listings (e.g., 18 million in the US alone), but users also do not frequently know, remember, or recite the exact business name as listed in the directory. FIG. 2 illustrates an example ADA scenario that employs wildcards to enhance the searching functionality.

In some cases, users think they know the correct listing but are often mistaken (e.g., "Le Sol Spa" for the listing "Le Soleil Tanning and Spa"). In other cases, they remember only part of the name with certainty (e.g., listing starts with "Le" and contains the word "Spa"). In these cases, what they remember may actually be sufficient to find the listing in a pure text-based interface. As shown in FIG. 2, an asterisk can be employed to express uncertainty in the input query. Unfortunately, in conventional voice-based search applications, users are forced to guess and whatever partial knowledge they could have provided is lost or otherwise not used.

In this specification, aspects are disclosed that expand the capabilities of voice-based search to enable users to explicitly express their uncertainties as part of their queries, and as such, to allow systems to leverage most any partial knowledge contained in those queries. In particular aspects, the innovation can be employed to define how uncertain expressions (and wildcards) using a word such as "something" as a wildcard can improve user experience and delineate an approach to handle these expressions. In particular, the innovation describes both language modeling techniques for training n-grams, as well as IR techniques for finding likely exact and approximate matches.

Turning now to a discussion of user uncertainty, before considering how uncertain expressions can improve user experience, it is worth examining how often users are uncertain about their queries. In order to investigate this question with respect to ADA, the innovation team performed a data analysis of 1.7 million training sentences. Unfortunately, it was not possible to separate all human transcribed calls from system generated data, such as recognition results and heuristically generated variations of listings. Given this qualification, it was found that only 27.8% of the training sentences matched the exact listings. In other words, in order to obtain the high levels of automation for ADA, roughly 72% of their training sentences did not match the exact listings. Among the 72%, the sentences were searched for inclusion of the word "something", since people tend to express uncertainty with this word. As a result of the search, 88 utterances were found, all of which were real transcribed calls. Overall, this represented only 0.5% of the training sentences, given a conservative estimate of the percentage of transcriptions in the data. What is important about 0.5% is that this number constitutes an anchor from which trade-off decisions can be made. In particular, if explicit expressions of uncertainty occur at this rate, the innovation should not lose much more than 0.5% in overall performance in order to gain the handling of these expressions. It is to be appreciated that 0.5% represents a lower bound, and is likely to increase when users realize that uncertain expressions can be utilized for searching. This trade-off issue is discussed below.

Turning to a discussion of uncertain expressions, in examining the 88 utterances containing "something", the following types of uncertain expressions (with examples in italics) were observed:

1. Uncertainty about specific words in the name.
   . . . Air *Something* Boeing
   U. J. C. United Jewish *Something* . . .
2. Uncertainty about which of several specific words belong in the name.
   Adirondack *Steak And Grill Or Grill And Steak* . . .
   The Skating Rink *Hot Wheels Skate or Something*
3. Uncertainty about the specific address.
   Arch Diocese On *Fifty Something Hundred* Street Catholic Services
   Paper House On *Seventy Something* In Amsterdam
4. General uncertainty about the entire query.
   Jillian's Game Palace *Or Something*
   N. C. I. Concord Cedar Junction Prison *Or Something Like That*
5. Uncertainty about the name with supplementary category information.
   It's A Hospital *I Think* It's Moses *Something Or Other*
   . . . Travel Trailer It's A Trailer *I Don't Know They Sell Trailers* . . .

With the first type of uncertain expression, users often replaced a word they did not remember with "something" or "something like that" as placeholders. With the second type, users suggested possible choices for parts of the name using an alternation such as "steak and grill or grill and steak". With the third type, because users can provide address information to constrain their search, users frequently expressed uncertainty about the exact address, mostly streets.

The first three types of uncertain expressions, in which users were uncertain about specific parts of their queries, constituted 48.8% of the sample utterances. The rest were expressions conveying general uncertainty—in some cases, users were uncertain about the entire query itself, using editing expressions such as "something like that" to convey doubt. In other cases, users provided information about the general category of their search, such as "I don't know they sell trailers". Finally, the rest of the general expressions were too ambiguous to classify (e.g., "Something Fun").

With regard to handling uncertain expressions, from the perspective of user experience, a voice search application capable of accommodating explicit user expressions of uncertainty, such as those described in the previous section, has tremendous appeal. The innovation described herein accommodates this functionality. In this section, the user experience of finding likely matches to uncertain expressions is highlighted. Then a delineation of the approach to implementing this user experience with respect to language modeling and information retrieval is shown. FIG. 2 illustrates example screenshots of a multi-modal voice search application displaying search results for the utterances "Le S Something Spa" and "Le Something Spa."

Because of possible trade-offs in overall performance due to handling all types of uncertain expressions, it is a focus of this disclosure on supporting the first and most common type; namely, uncertain expressions about specific words in the name. In particular, support has been added for both recognition of a trigger word such as "something" in a query as well as retrieval of likely matches using "something" as a wildcard (*) in a regular expression. Noticing how users sometimes knew part of the spelling of words, such as in "U.J.C. United Jewish Something", in aspects, it is decided to handle initial characters of words as well so that users could say "United Jewish C Something", where "C" is the initial character for the word "Church".

A telephony-based ADA system for handling uncertain expressions would allow users to engage in more natural dialogues such as the following:
System: City and state please.
User: Seattle, Wash.
S: Say the name of the business you want . . .
U: Le Sol Spa.
S: Esperanza, located on . . .
U: Le Sol Sun Spa.
S: Sorry, I didn't get that. Please try again. You can say "something" for any part of the name you are not sure of, such as "chateau something winery." You can also spell the first letter along with "something", such as "c something winery."
U: Le S Something Spa.
S: Le Soleil Tanning & Spa, located on . . .

In the example above, the user initially provided incorrect listings. Upon learning how "something" could be used, the user then specified whatever partial knowledge available; namely, that the listing starts with "Le", followed by a word beginning with "S", and containing the word "Spa". This partial knowledge was indeed enough to obtain the desired listing. As indicated, in this aspect, the system informed the user of its capabilities only after it had failed several times. It will be understood that other aspects can convey search options in most any manner without departing from the spirit and/or scope of the innovation and claims appended hereto.

Voice search applications with a UI can offer even richer user experiences. In accordance with the subject multi-modal interface, the innovation displays not only the top matches for uncertain expressions, but also the query itself for users to edit, in the event it is desired to refine queries using text. FIG. 2 shows a screenshot of the results for the spoken utterance "Le S Something Spa" (left), from the previous example, as well the more general expression "Le Something Spa" (right). Note that the system not only retrieved exact matches for the utterances as a regular expression query, but also approximate matches.

Turning now to a discussion of language modeling, recent approaches to voice search involve recognition plus IR. For ADA recognition, n-gram statistical language models are typically used to compress and generalize across listings as well as their observed user variations. In order to support n-gram recognition of uncertain expressions, in one example, it was decided to modify the training data. Given that not enough occurrences of the word "something" appeared in the training sentences for it to be accurately recognized (e.g., 88), that number was boosted artificially by creating pseudo-listings from the original data. For every listing which was not a single word (e.g., "Starbucks"), the innovation adds new listings with "*" and "i-*" replacing individual words, where i denotes the initial letter of the word being replaced.

For listings with more than two words, because people tend to remember either the first or last word of a listing, the innovation focused on replacing interior words. Furthermore, to preserve counts for priors, 4 new listings (and 4 duplicates for single word listings) were added. For example, for the listing "Le Soleil Tanning and Spa", "Le *", "Le S*", "* Spa", and "T* Spa" were generated. Although this approach of adding new listings with words replaced by "*" and "i-*" is certainly a heuristic, it was found that it facilitated adequate bigram coverage. Finally, the pronunciation dictionary was modified so that "*" could be recognized as "something."

One advantage of this approach was two-fold. First, because the innovation replaced words with "*" and "i-*" instead of the word "something" and avoided conflicts with businesses that had "something" as part of their name (only 9 in the Seattle area). Second, by having the recognition produce wildcards it is possible to treat the recognized result in its very condition as a regular expression for search.

Referring now to information retrieval (IR), after obtaining a regular expression from a recognizer (e.g., "Le* Spa"), an index and retrieval algorithm can be employed to quickly find likely matches for the regular expression. In one aspect, this was accomplished by encoding the directory listing as a k-best suffix array. Because a k-best suffix array is sorted by both lexicographic order and any figure of merit, such as the popularity of listings in the call logs, preference, etc. it is a convenient data structure for finding the most likely, or in this case, the most popular matches for a substring, especially when there could be many matches.

For example, for the query "H* D*", the k-best suffix array would quickly return "Home Depot" as the top match. Furthermore, because lookup time for finding the k most popular matches is close to O(log N) for most practical situations with a worst case guarantee of O(sqrt N), where N is the number of characters in the listings, user experience did not suffer from any additional retrieval latencies. Note that before any regular expression was submitted as a search query, a few simple heuristics can be applied to clean it up (e.g., consecutive wildcards can be collapsed into a single wildcard).

Besides regular expression queries using a k-best suffix array, which provides popular exact matches to the listings, it can also useful to also obtain approximate matches. For at least this purpose, an improved term frequency can be implemented—e.g., inverse document frequency (TFIDF) algorithm. Because statistical language models can produce garbled output, voice search typically utilizes approximate search techniques, such as TFIDF, because they treat the output as just a bag of words.

This can be advantageous when users either incorrectly remember the order of words in a listing, or add spurious words. In some ways, the two IR methods are flip sides of each other. The strength of finding exact matches is that the innovation can leverage most any partial knowledge users may have about their queries (e.g., word order) as well as the popularity of any matches. This is the strength of finding approximate matches; it is indifferent to word order and other mistakes users often make.

Turning now to an evaluation of the innovation's approach by first assessing its impact on overall ADA performance and then by discussing the results of a novel user experiment conducted. With regard to impact on ADA performance, no matter how compelling the user experience of using uncertain expressions to search for listings may be, if the trade-off in overall ADA performance is unfavorable it may not be worthwhile. Given that uncertain expressions occurred in at least 0.5% of the transcriptions, assuming that at least twice as many users are likely to start producing these expressions once they are supported, it may not be worthwhile to make changes to ADA if the overall performance drops by more than 1%.

To assess impact on performance, 2317 transcribed ADA utterances were obtained from Microsoft Live Search Mobile, a multi-modal voice search application for Windows-based mobile phones. All the utterances were exact business listings so that it would be possible to more closely examine any degradation in speech recognition accuracy due to the approach on utterances that should be recognized correctly. Keeping all other factors besides the language model constant, both the Top 1 recognition accuracy and the Top N (where N=10, including the top 1) were evaluated, since some voice search applications such as Live Search Mobile display n-best lists to users for disambiguation. Overall, the Top 1 accuracy dropped from 71.8% to 71.1%, a 1% relative reduction. Furthermore, the Top N accuracy dropped from 80.1% to 79.8%, a 0.4% relative reduction. Because both reductions are almost negligible, it was concluded that the heuristic approach described supra to support recognition of uncertain expressions using "*" and "i-*" results in minimal ADA performance loss.

In order to assess whether handling uncertain expressions is better than allowing users to simply guess the listing whenever they are uncertain, a novel experiment similar to a game paradigm was developed. In the protocol, subjects were presented with a list of local businesses and asked to cross out any business they were either familiar with or had heard of (e.g., through advertisements). Among the remaining businesses, subjects were asked to circle 10 from which they would like to receive free products or services. They also had to rank these businesses in the order of their preference. When subjects were finished, their list was taken away, and they were asked to write down all 10 businesses they had just ranked. For recalling the businesses, the subjects were instructed to use an underscore wherever they thought they might be missing words, and to also write down their best guess for what those missing words might be.

Subjects were given as much time as desired. Afterwards, subjects were recorded reading off their list, asking them to replace the underscores with either "something" or their best guess. Hence, for every "something" expression there was a corresponding best guess. In all, 15 subjects were recruited who recorded 178 utterances, with 54 guesses and 54 "something" expressions. The subjects were all of various nationalities and accents.

Because one ultimate goal of ADA is to find a target listing, the retrieval accuracy was measured using either guesses or "something" expressions. As before, not only the Top 1 accuracy was assessed but also the Top N (N=1-10). For guesses, approximate matches were retrieved for the top recognized result, as described above. For "something" expressions, it was attempted to first retrieve exact matches for the recognized result and then obtained as many approximate matches as needed to fill N (using the recognized result without wildcards). It was found that the language model recognized "something" at 93% accuracy.

Overall, "something" expressions were roughly 2 times more accurate than guesses for the Top 1 case, and 2.4 times more accurate for the Top N case. Note that whenever the target listing did not occur among the Top N matches, this was counted as an error. With respect to errors, leveraging uncertain expressions dropped the rate from 81.5% to 55.6%, a 31.8% relative reduction. The difference in Top N accuracy between guesses and "something" expressions was statistically significant using McNemar's exact binomial test ($p<0.01$).

However, the difference in Top 1 accuracy was only significant using a 1-failed test ($p<0.05$). Because finding the most likely exact matches depends the popularity of the matched listings, the results were separated depending on whether the listing occurred frequently in the call logs (e.g., >100/month) or not. As expected, the accuracy of "something" expressions was higher for high frequency listings, increasing Top 1 and Top N accuracies by more than a factor of 3. On the other hand, the accuracy of "something" expressions for low frequency listings was only higher in the Top N case. This suggests that uncertain expressions may be best utilized by ADA systems with a GUI for disambiguation.

It is to be understood that the aforementioned discussion of experimental testing is included to provide perspective and an example utility of the innovation. Further, this discussion is not intended to limit the scope of the innovation in any manner. Rather, the examples, in addition to alternative examples, are to be included within the scope of this disclosure and claims appended hereto.

Figure 3:
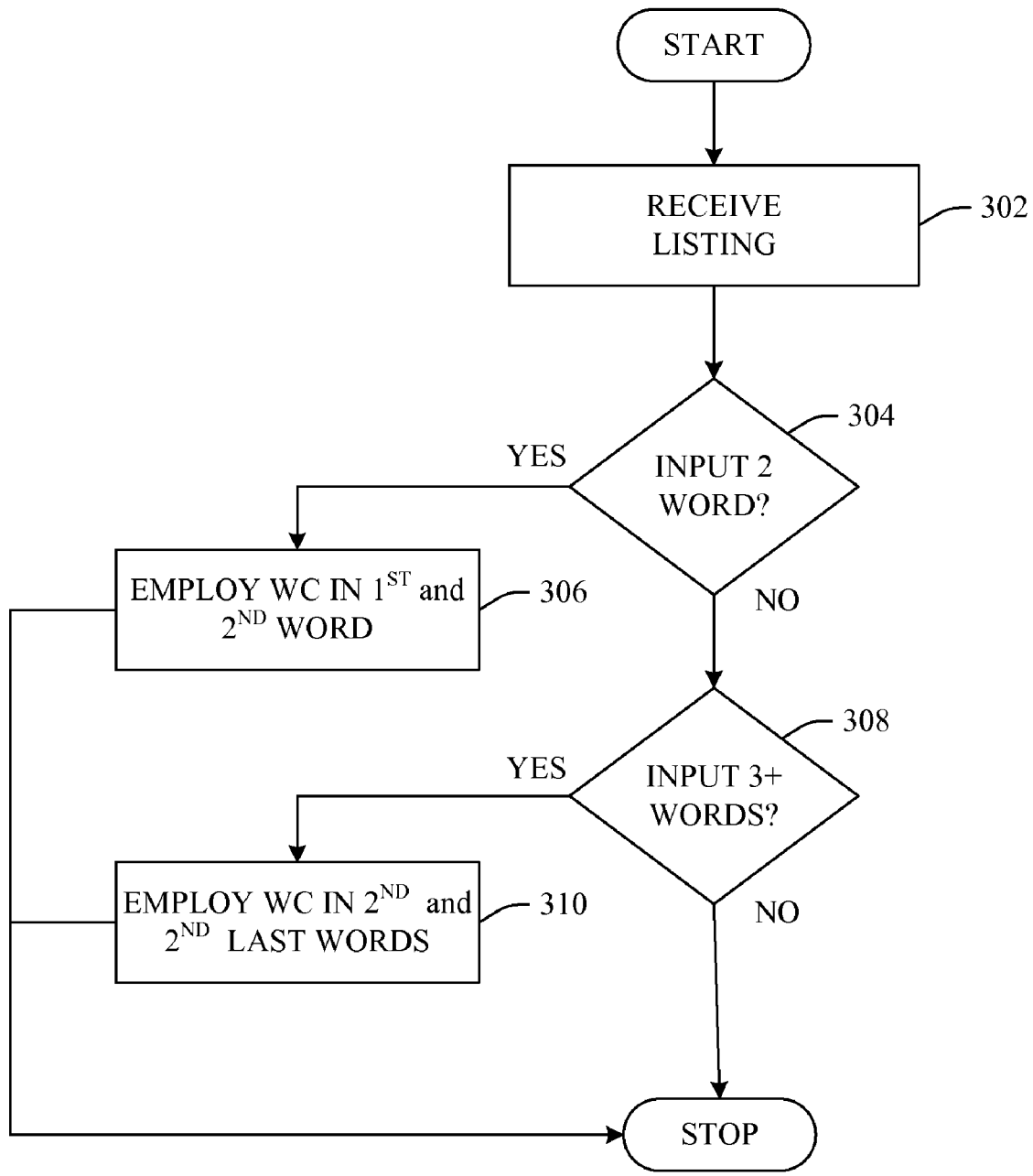
FIG. 3 illustrates an example flow diagram of employing wildcards in accordance with an aspect of the innovation.

FIG. 3 illustrates a methodology of converting an input into wildcards in accordance with an aspect of the innovation. While, for purposes of simplicity of explanation, the one or more methodologies shown herein, e.g., in the form of a flow chart, are shown and described as a series of acts, it is to be understood and appreciated that the subject innovation is not limited by the order of acts, as some acts may, in accordance with the innovation, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation.

Turning now to a discussion of language modeling, recent approaches to voice search involve recognition plus IR. For ADA recognition, n-gram statistical language models are typically used to compress and generalize across listings as well as their observed user variations. In order to support n-gram recognition of uncertain expressions, in one example, it was decided to modify the training data. Given that not enough occurrences of the word "something" appeared in the training sentences for it to be accurately recognized (e.g., 88), that number can be boosted artificially by creating pseudo-listings from the original data. For every listing which was not a single word (e.g., "Starbucks"), the innovation adds new listings with "*" and "i-*" replacing individual words, where i denotes the initial letter of the word being replaced.

The methodology of FIG. 3 is but one example of wildcard generation in accordance with an aspect of the innovation. At 302, a user input is received, for example, a spoken input in one aspect At 304, a decision is made to determine if the input is comprised of two words. If so, at 306, both words can be replaced with wildcards. That is, a wildcard, together with the first letter of the first word can be substituted in place of the first word. And another wildcard, together with the first letter of the last word can be substituted in place of the last word. For example, the wildcard expansion of the listing "Home Depot" consists of "* Depot", "H* Depot", "Home *", and "Home D*".

Otherwise, a determination is made at 308. If at 308, it is determined that the query contains three or more words, at 310 wildcards can be inserted in place of middle words. Two sub phrases are extracted from the first and the last two words. And the second and the second last words are replaced with wildcards. As described above, studies have shown that this use of wildcards is effective in achieving a user intention. No wildcard expansion is needed if the listing is a single word.

While a specific wildcard query conversion flow methodology is shown in FIG. 3, it is to be understood that other conversion methodologies can be employed in alternative aspects. For instance, as described herein, the innovation can monitor inputs for wildcard trigger words such as, but not limited to, 'something,' 'whatchamacallit,' 'whatever,' etc. These trigger words can be converted to wildcards and employed in a wildcard query to enhance comprehensiveness of a search. As such, the flow of FIG. 3 is not intended to limit the scope of the disclosure and claims appended hereto. Rather, these alternative aspects are to be included within the scope of this disclosure and claims appended hereto.

Figure 4:
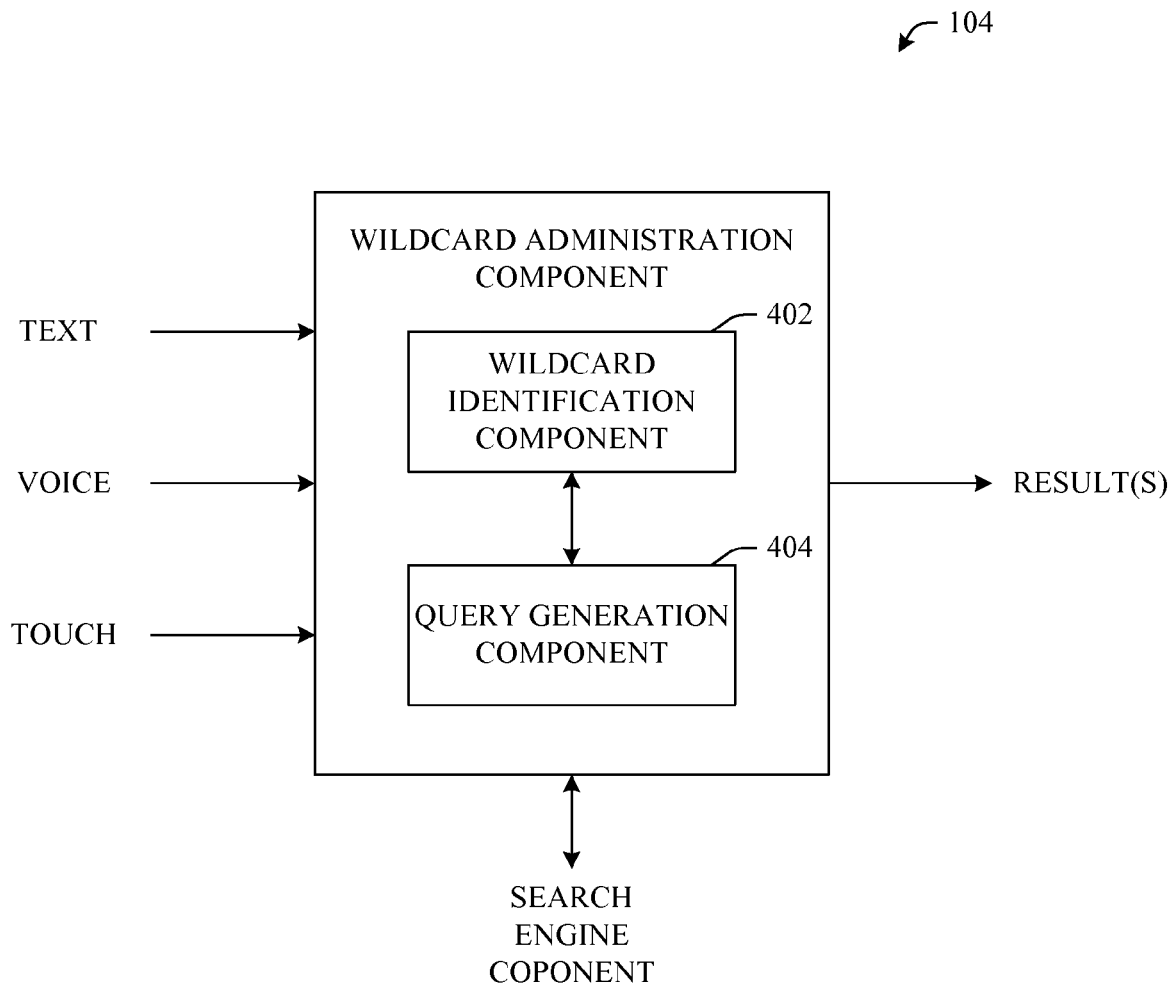
FIG. 4 illustrates an example wildcard administration component that identifies appropriate wildcards and generates a query expression in accordance with an aspect of the innovation.

Turning now to FIG. 4, a block diagram of an example wildcard administration component 104 is shown. Generally, the example wildcard administration component 104 can include a wildcard identification component 402 and a query generation component 404. In operation, these subcomponents (402, 404) can process a multi-modal input to establish appropriate wildcards. These wildcards can be employed in a wildcard query (e.g., regular expression query) to enhance effectiveness of a user search.

The wildcard identification component 402 can be used to identify explicitly included wildcards within a multi-modal input. For example, the component 402 can be used to identify wildcard trigger words such as 'something,' 'whatchamacallit,' 'whatever,' etc. Once identified, these trigger words can be converted into wildcards and employed by the query generation component 404 in establishing an appropriate wildcard query, for example, a regular expression query. As will be described below, it will be appreciated that the trigger words can be system- or user-identified as desired or appropriate. For example, the system can monitor user input and identify 'filler' words such as 'something,' 'whatever,' etc. Thereafter, artificial intelligence (AI) or other machine learning & reasoning (MLR) mechanisms can be employed to tag or otherwise recognize these frequently used 'filler' words as wildcard triggers.

In other examples, users can explicitly train the system by identifying words or phrases which are to be employed as wildcard triggers. Here, a user can identify most any word or phrase such that wildcards are triggered when these words or phrases are identified by the wildcard identification component 402. By way of example, a user can define 'beep' as a trigger word. In this example, upon speaking an input of 'black beep restaurant,' the system can convert the trigger word to conclude 'black * restaurant.' Thus, results can be returned that include 'black angus restaurant,' 'black stallion restaurant,' 'black sheep restaurant,' or the like.

Figure 5:
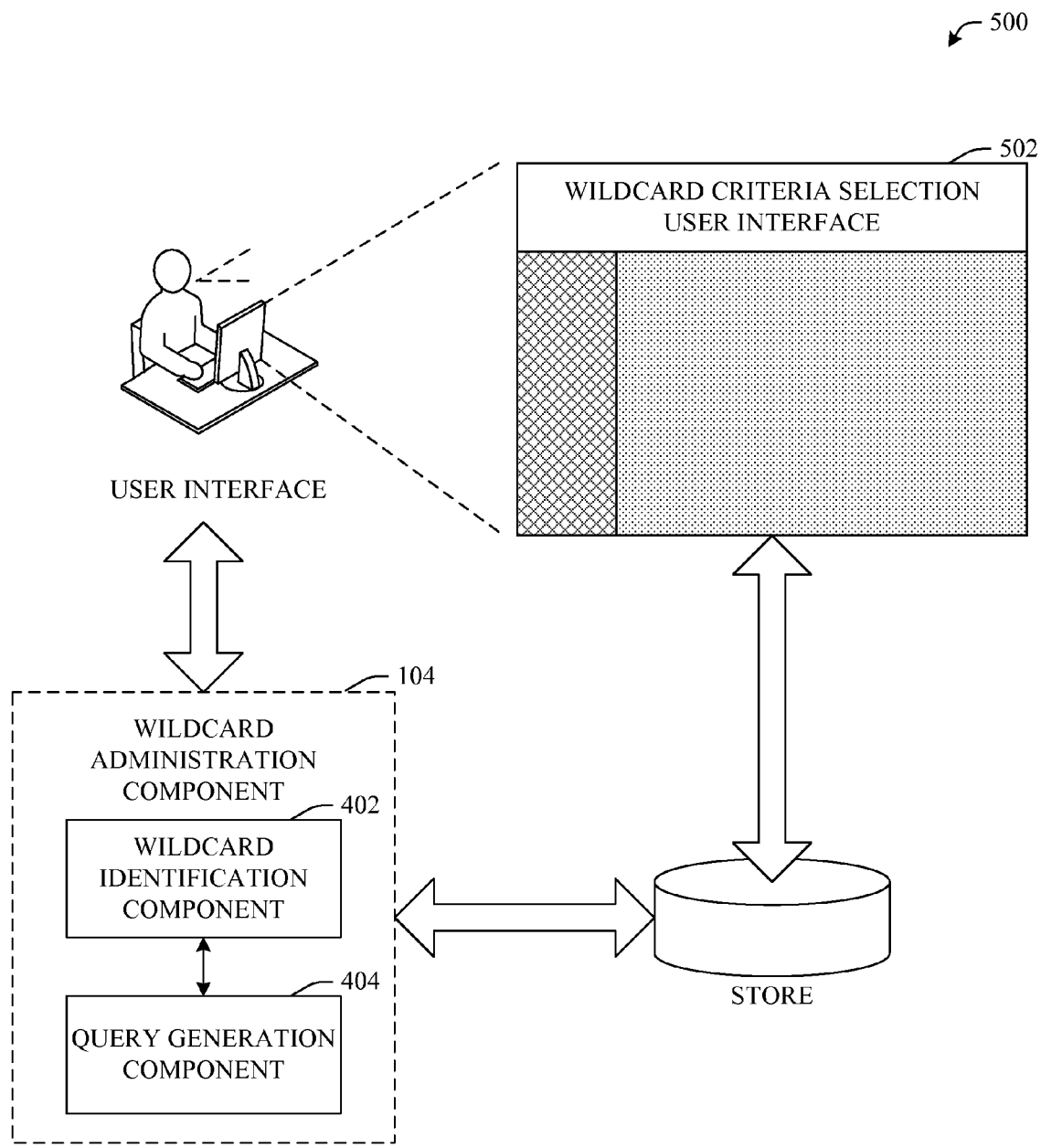
FIG. 5 illustrates an example system that employs a user interface to define wildcard triggers in accordance with aspects of the innovation.

FIG. 5 illustrates an example system 500 that facilitates explicit generation of wildcard trigger words in accordance with an aspect of the innovation. As shown, the system 500 employs a user interface (UI) 502 that enables users to identify or designate wildcard trigger words and/or phrases. While examples described herein employ 'something' and 'whatchamacallit' as trigger words, it is to be understood that most any word or phrase can be employed to identify wildcard triggers.

As shown, a user can textually, as well as audibly, communicate with the UI 502 while identifying triggers. A store can be employed to maintain the identified triggers. Thus, in operation, the wildcard administration component 104 can interface with the store as needed in converting terms to wildcards and thereafter in establishing an appropriate search query.

Internet usage, especially via mobile devices, continues to grow as users seek anytime, anywhere access to information. Because users frequently search for businesses, directory assistance has been the focus of conventional voice search applications utilizing speech as the primary input modality. Unfortunately, mobile settings often contain noise which degrades performance of speech recognition functionalities.

In addition to converting triggers into wildcards, the innovation can take advantage of most any partial knowledge users may have about the business listing by letting them express their uncertainty in a simple, intuitive way. With regard to contstraining speech recognition results, providing text hints along with the spoken utterance resulted in a relative reduction, with dramatic gains in recovery for each additional character.

As can be appreciated, according to market research, mobile devices are believed to be poised to rival desktop and laptop PCs as the dominant Internet platform, providing users with anytime, anywhere access to information. One common request for information is the telephone number or address of local businesses. Because perusing a large index of business listings can be a cumbersome affair using existing mobile text and touch input mechanisms, directory assistance has been the focus of voice search applications, which utilize speech as the primary input modality. Unfortunately, mobile environments pose problems for speech recognition, even for native speakers. First, mobile settings often contain non-stationary noise which cannot be easily cancelled or filtered. Second, speakers tend to adapt to surrounding noise in acoustically unhelpful ways. Under such adverse conditions, task completion for voice search is less than stellar, especially in the absence of an effective correction user interface for dealing with speech recognition errors.

The innovation can take advantage of most any partial knowledge users may have about the words of the business listing. For example, a user may only remember that the listing starts with an "s" and also contains the word "avenue". Likewise, the user may only remember "Saks something", where the word "something" is used to express uncertainty about what words follow. As stated above, while the word 'something' is used in the aforementioned example, it is to be appreciated that most any desired word or indicator can be used without departing from the spirit/scope of the innovation and claims appended hereto. The innovation represents this uncertainty as wildcards in an enhanced regular expression search of the listings, which exploits the popularity of the listings.

Figure 6C:
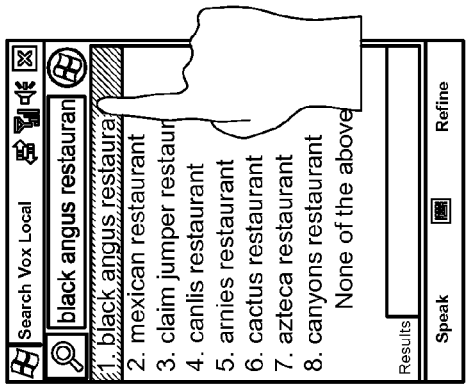
FIG. 6a-e illustrate that a user can specify uncertain information using the word "something" in accordance with aspects.
Figure 6E:
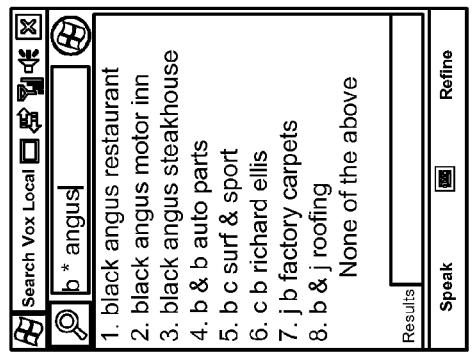
Figure 6B:
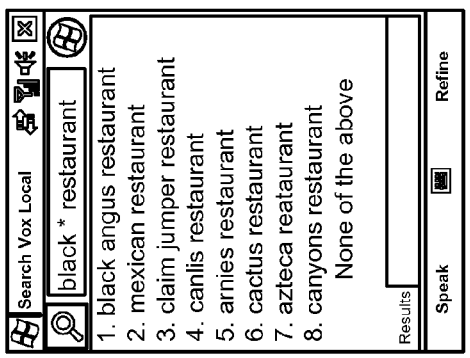
Figure 6A:
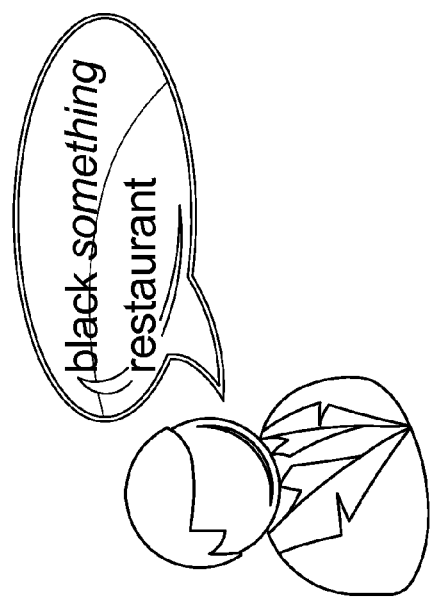

Referring again to the aforementioned example, in the example of FIG. 6, the user is looking for "black angus restaurant" but only remembers that the first word is "black." Here, the user can simply say, "black something restaurant" (FIG. 6a). Noticing that there is no "black something restaurant" in the listings, the innovation will convert the "something" into a wildcard and retrieve exact along with approximate matches (FIG. 6b). Now, the query appears among the choices and the user simply selects the appropriate choice and is finished (FIG. 6c).

Figure 6D:
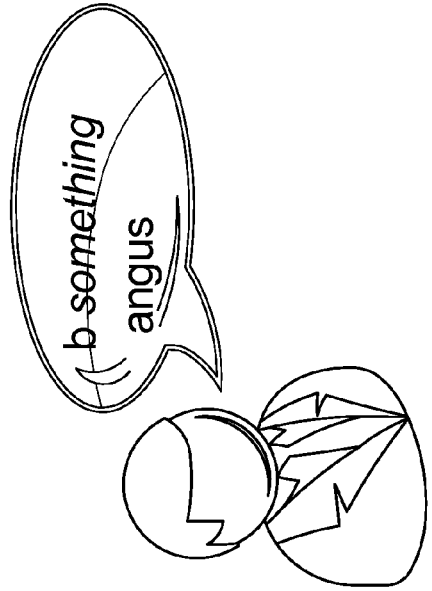

In order to support the recognition of "something" expressions of uncertainty, the innovation adjusts the statistical language model to allow for transitions to the word "something" before and after every word in the training sentences as a bigram. Business listings that actually contain the word "something" were far and few, and appropriately tagged to not generate a wildcard during inverse text normalization of the recognized result. The innovation can also transform the training sentences into one character prefixes so that it could support partial knowledge queries such as, "b something angus" for "b* angus" (FIGS. 6d-e).

The innovation interface belongs to a long tradition of "taming" speech recognition errors with a multi-modal interface. Although the innovation was designed with mobile voice search in mind, in certain situations it may make sense to exploit richer gestures other than simply selecting via touch or d-pad. For example, users could use gestures to separate words that they want in their query from those they wish to exclude.

In this disclosure, a multi-modal interface that can be used for mobile voice search applications is presented. This interface not only facilitates touch and text refinement whenever speech fails, but also allows users to assist the recognizer via text hints as well as to define wildcard triggers. As described above, the innovation can also take advantage of any partial knowledge users may have about their queries by letting them express their uncertainty through "something" expressions. Also discussed was the overall architecture and details of how the innovation could quickly retrieve exact and approximate matches to the listings from the backend. Finally, in evaluating the innovation via simulation experiments conducted on real mobile voice search data, the innovation found that leveraging multi-modal refinement using the word palette resulted in a 28% relative reduction in error rate. Furthermore, providing text hints along with a spoken utterance resulted in dramatic gains in recovery rate, though this should be qualified by stating that users in the test data tended to ask for popular listings which we could retrieve quickly.

Also in this disclosure, expanding the capabilities of voice search to enable users to explicitly express their uncertainty as part of their queries is disclosed, and as such, to allow systems to leverage most any partial knowledge contained in those queries is also disclosed herein. In particular, for the ADA example, an approach to language modeling and information retrieval is described, and the natural, enhanced user experience that explicit uncertain expressions afford is highlighted. Furthermore, in evaluating the approach, it is demonstrated that it is possible to handle uncertain expressions with minimal loss to overall ADA performance and that using these expressions can significantly reduce error rate compared to guessing, especially for ADA systems with a GUI for disambiguation.

Additionally, the innovation can also support more data-driven approaches to generating n-gram training sentences with "*" and "i-*" word replacements. For example, in conducting user experiments, it was observed that people tended to forget proper names. By collecting more utterances, it may be possible to learn models of what words people are likely to forget. This could be useful for not only generating "something" data for language model training, but also alternative expressions for listings to improve IR in general. Finally, another research direction is to explore enabling other expressions of uncertainty, such as alternations.

Figure 7:
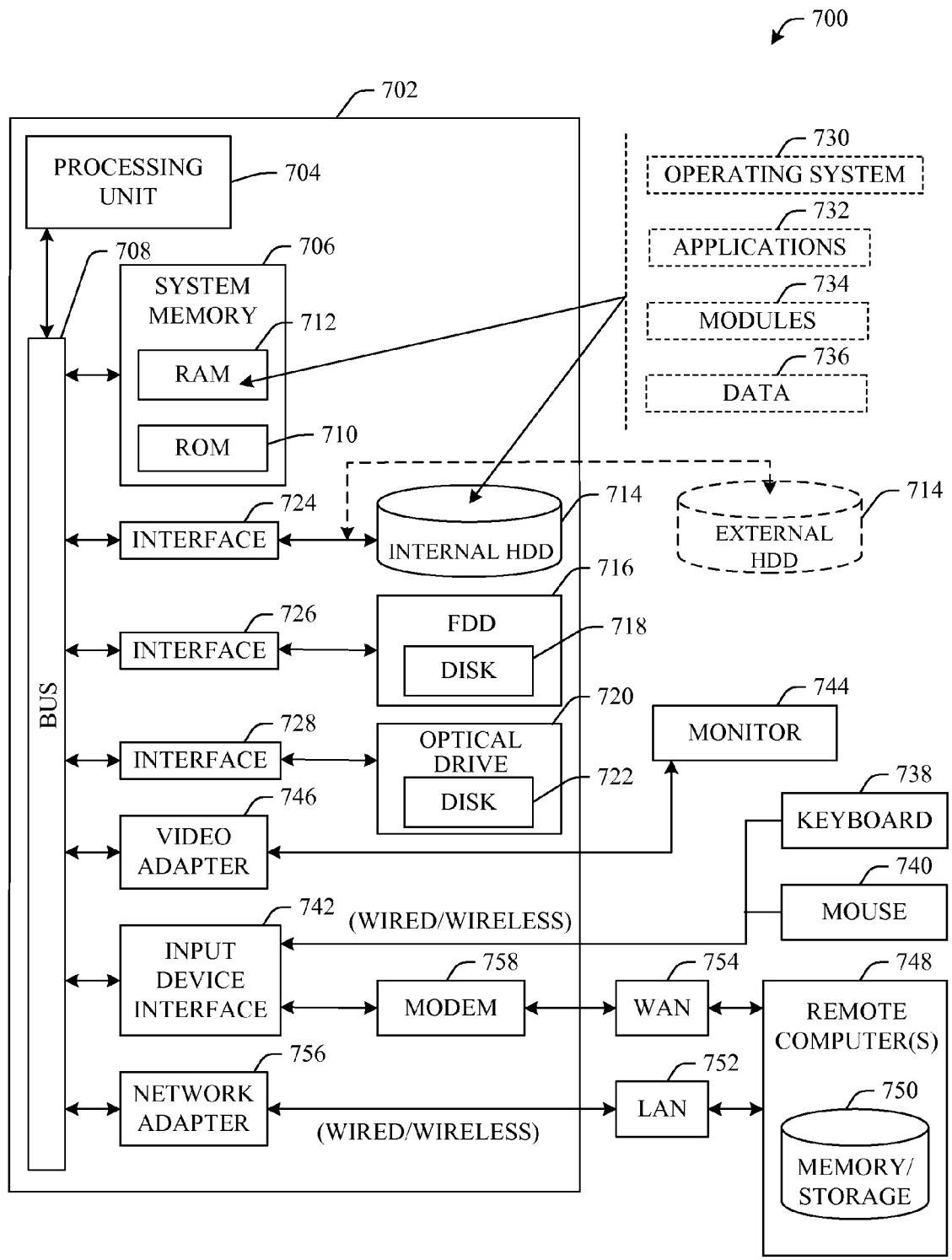
FIG. 7 illustrates a block diagram of a computer operable to execute the disclosed architecture.

Referring now to FIG. 7, there is illustrated a block diagram of a computer operable to execute the disclosed architecture. In order to provide additional context for various aspects of the subject innovation, FIG. 7 and the following discussion are intended to provide a brief, general description of a suitable computing environment 700 in which the various aspects of the innovation can be implemented. While the innovation has been described above in the general context of computer-executable instructions that may run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 7, the exemplary environment 700 for implementing various aspects of the innovation includes a computer 702, the computer 702 including a processing unit 704, a system memory 706 and a system bus 708. The system bus 708 couples system components including, but not limited to, the system memory 706 to the processing unit 704. The processing unit 704 can be any of various commercially available processors. Dual microprocessors and other multi-processor architectures may also be employed as the processing unit 704.

The system bus 708 can be any of several types of bus structure that may further interconnect to a memory bus (with or without a memory controller), a peripheral bus, and a local bus using any of a variety of commercially available bus architectures. The system memory 706 includes read-only memory (ROM) 710 and random access memory (RAM) 712. A basic input/output system (BIOS) is stored in a non-volatile memory 710 such as ROM, EPROM, EEPROM, which BIOS contains the basic routines that help to transfer information between elements within the computer 702, such as during start-up. The RAM 712 can also include a high-speed RAM such as static RAM for caching data.

The computer 702 further includes an internal hard disk drive (HDD) 714 (e.g., EIDE, SATA), which internal hard disk drive 714 may also be configured for external use in a suitable chassis (not shown), a magnetic floppy disk drive (FDD) 716, (e.g., to read from or write to a removable diskette 718) and an optical disk drive 720, (e.g., reading a CD-ROM disk 722 or, to read from or write to other high capacity optical media such as the DVD). The hard disk drive 714, magnetic disk drive 716 and optical disk drive 720 can be connected to the system bus 708 by a hard disk drive interface 724, a magnetic disk drive interface 726 and an optical drive interface 728, respectively. The interface 724 for external drive implementations includes at least one or both of Universal Serial Bus (USB) and IEEE 1394 interface technologies. Other external drive connection technologies are within contemplation of the subject innovation.

The drives and their associated computer-readable media provide nonvolatile storage of data, data structures, computer-executable instructions, and so forth. For the computer 702, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the innovation.

A number of program modules can be stored in the drives and RAM 712, including an operating system 730, one or more application programs 732, other program modules 734 and program data 736. All or portions of the operating system, applications, modules, and/or data can also be cached in the RAM 712. It is appreciated that the innovation can be implemented with various commercially available operating systems or combinations of operating systems.

A user can enter commands and information into the computer 702 through one or more wired/wireless input devices, e.g., a keyboard 738 and a pointing device, such as a mouse 740. Other input devices (not shown) may include a microphone, an IR remote control, a joystick, a game pad, a stylus pen, touch screen, or the like. These and other input devices are often connected to the processing unit 704 through an input device interface 742 that is coupled to the system bus 708, but can be connected by other interfaces, such as a parallel port, an IEEE 1394 serial port, a game port, a USB port, an IR interface, etc.

A monitor 744 or other type of display device is also connected to the system bus 708 via an interface, such as a video adapter 746. In addition to the monitor 744, a computer typically includes other peripheral output devices (not shown), such as speakers, printers, etc.

The computer 702 may operate in a networked environment using logical connections via wired and/or wireless communications to one or more remote computers, such as a remote computer(s) 748. The remote computer(s) 748 can be a workstation, a server computer, a router, a personal computer, portable computer, microprocessor-based entertainment appliance, a peer device or other common network node, and typically includes many or all of the elements described relative to the computer 702, although, for purposes of brevity, only a memory/storage device 750 is illustrated. The logical connections depicted include wired/wireless connectivity to a local area network (LAN) 752 and/or larger networks, e.g., a wide area network (WAN) 754. Such LAN and WAN networking environments are commonplace in offices and companies, and facilitate enterprise-wide computer networks, such as intranets, all of which may connect to a global communications network, e.g., the Internet.

When used in a LAN networking environment, the computer 702 is connected to the local network 752 through a wired and/or wireless communication network interface or adapter 756. The adapter 756 may facilitate wired or wireless communication to the LAN 752, which may also include a wireless access point disposed thereon for communicating with the wireless adapter 756.

When used in a WAN networking environment, the computer 702 can include a modem 758, or is connected to a communications server on the WAN 754, or has other means for establishing communications over the WAN 754, such as by way of the Internet. The modem 758, which can be internal or external and a wired or wireless device, is connected to the system bus 708 via the serial port interface 742. In a networked environment, program modules depicted relative to the computer 702, or portions thereof, can be stored in the remote memory/storage device 750. It will be appreciated that the network connections shown are exemplary and other means of establishing a communications link between the computers can be used.

The computer 702 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10 BaseT wired Ethernet networks used in many offices.

Figure 8:
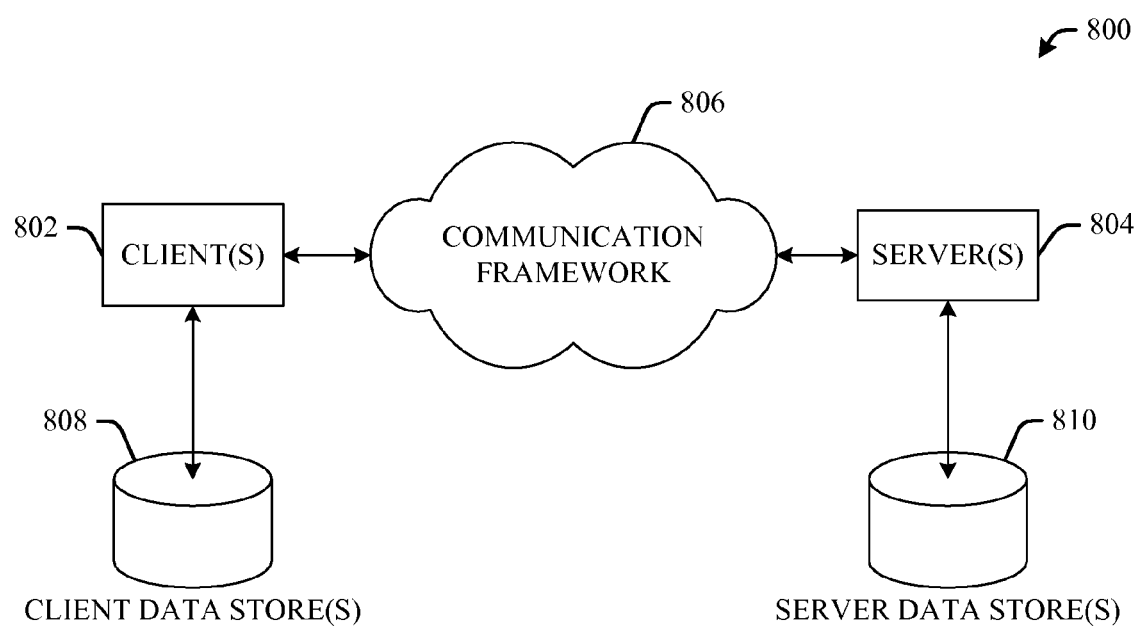
FIG. 8 illustrates a schematic block diagram of an exemplary computing environment in accordance with the subject innovation.

Referring now to FIG. 8, there is illustrated a schematic block diagram of an exemplary computing environment 800 in accordance with the subject innovation. The system 800 includes one or more client(s) 802. The client(s) 802 can be hardware and/or software (e.g., threads, processes, computing devices). The client(s) 802 can house cookie(s) and/or associated contextual information by employing the innovation, for example.

The system 800 also includes one or more server(s) 804. The server(s) 804 can also be hardware and/or software (e.g., threads, processes, computing devices). The servers 804 can house threads to perform transformations by employing the innovation, for example. One possible communication between a client 802 and a server 804 can be in the form of a data packet adapted to be transmitted between two or more computer processes. The data packet may include a cookie and/or associated contextual information, for example. The system 800 includes a communication framework 806 (e.g., a global communication network such as the Internet) that can be employed to facilitate communications between the client(s) 802 and the server(s) 804.

Communications can be facilitated via a wired (including optical fiber) and/or wireless technology. The client(s) 802 are operatively connected to one or more client data store(s) 808 that can be employed to store information local to the client(s) 802 (e.g., cookie(s) and/or associated contextual information). Similarly, the server(s) 804 are operatively connected to one or more server data store(s) 810 that can be employed to store information local to the servers 804.

What has been described above includes examples of the innovation. It is, of course, not possible to describe every conceivable combination of components or methodologies for purposes of describing the subject innovation, but one of ordinary skill in the art may recognize that many further combinations and permutations of the innovation are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system that facilitates multi-modal search, comprising:
    a wildcard identification component that recognizes one or more pre-selected trigger words in a multi-modal speech input as triggering at least one wildcard symbol to be used for performing text-based searching using the multi-modal speech input; and
    a search engine component that generates one or more text search queries, each text search query including the at least one wildcard symbol and one or more fixed words from the multi-modal speech input.

2. The system of claim 1, further comprising a wildcard generation component that replaces the one or more pre-selected trigger words with the at least one wildcard symbol.

3. The system of claim 2, wherein the wildcard identification component uses speech recognition to identify the one or more pre-selected trigger words in the multi-modal speech input.

4. The system of claim 2, wherein the one or more pre-selected trigger words include least one of 'something' or 'whatchamacallit'.

5. The system of claim 1, wherein the at least one wildcard symbol conveys uncertainty, and non-wildcard characters in the one or more fixed words represent constraints for the search engine component.

6. The system of claim 1, wherein each text search query is a regular expression query that includes the at least one wildcard symbol.

7. The system of claim 1, wherein the one or more search queries represent approximate matches to at least a portion of the multi-modal speech input.

8. The system of claim 1, further comprising a user interface that enables a user to associate the one or more pre-selected trigger words with the at least one wildcard symbol.

9. The system of claim 1, wherein the one or more search queries include an n-best list from a speech recognizer and a list of supplementary results including at least one of an exact match via a wildcard expression or an approximate match via information retrieval algorithms.

10. The system of claim 9, wherein at least a part of the n-best list obtained from the speech recognizer is submitted to an information retrieval algorithm that is indifferent to the order of words in the query.

11. The system of claim 10, wherein the information retrieval algorithm is an algorithm that is indifferent to word order in the query or is the Term Frequency Inverse Document Frequency (TFIDF) algorithm.

12. The system of claim 1, further comprising an artificial intelligence (AI) component that employs at least one of a probabilistic and a statistical-based analysis that infers an action that a user desires to be automatically performed.

13. A computer-implemented method of multi-modal search, comprising:
    receiving a multimodal speech input from a user that includes one or more wildcard trigger words and one or more fixed words;
    identifying the one or more wildcard trigger words present in the multi-modal speech input and replacing each wildcard trigger word in the multi-modal speech input with a corresponding wildcard symbol; and
    establishing a wildcard text query expression that represents a desired search intent using one or more wildcard symbols and the one or more fixed words from the multi-modal speech input.

14. The computer-implemented method of claim 13, further comprising generating a plurality of search queries based upon the wildcard text query expression.

15. The computer-implemented method of claim 13, further comprising defining a correspondence between a wildcard trigger word and a wildcard symbol.

16. The computer-implemented method of claim 13, wherein the multi-modal speech input further includes a text hint that constrains the wildcard text query expression.

17. The computer-implemented method of claim 13, wherein the one or more wildcard trigger words include at least one of 'something' or 'whatchamacallit'.

18. A system, comprising:
    a wildcard identification component that recognizes one or more pre-selected trigger words in a multi-modal input as triggering at least one wildcard symbol to be used for performing searches using the multi-modal input; and
    a search engine component that generates one or more search queries, each search query including the at least one wildcard symbol and one or more fixed words from the multi-modal speech input.

19. The system of claim 18, wherein the at least one wildcard symbol conveys uncertainty, and non-wildcard characters in the one or more fixed words represent constraints for the one more search queries.

20. The computer-executable system of claim 18, wherein the one or more search queries represent approximate matches to at least a portion of the multi-modal input.

\* \* \* \* \*